United States Patent
Shimizu

(10) Patent No.: US 6,882,325 B2
(45) Date of Patent: Apr. 19, 2005

(54) RADIO CARD

(75) Inventor: Hiroo Shimizu, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 265 days.

(21) Appl. No.: 10/237,179

(22) Filed: Sep. 9, 2002

(65) Prior Publication Data

US 2003/0227421 A1 Dec. 11, 2003

(30) Foreign Application Priority Data

Jun. 5, 2002 (JP) ........................................ 2002-164642

(51) Int. Cl.⁷ .............................................. H01Q 21/00
(52) U.S. Cl. ................ 343/867; 343/742; 343/700 MS; 235/492
(58) Field of Search ........................ 343/700 MS, 741, 343/742, 866, 867, 895; 235/380, 487, 488, 492

(56) References Cited

U.S. PATENT DOCUMENTS

| 6,160,526 A | * | 12/2000 | Hirai et al. ................. 343/895 |
| 6,173,900 B1 | | 1/2001 | Yoshigi et al. |
| 6,343,744 B1 | * | 2/2002 | Shibata et al. ............... 235/492 |
| 6,412,702 B1 | * | 7/2002 | Ishikawa et al. ............ 235/492 |

FOREIGN PATENT DOCUMENTS

| EP | 0 997 842 A2 | 5/2000 |
| EP | 1 033 675 A2 | 9/2000 |
| GB | 2 308 745 | 7/1997 |
| JP | 11-268461 | 10/1999 |
| JP | 2000-113143 | 4/2000 |
| JP | 2000-137777 | 5/2000 |
| JP | 2000-222542 | 8/2000 |
| JP | 2001-5930 | 1/2001 |
| JP | 2001-7629 | 1/2001 |
| WO | WO 02/059832 A1 | 8/2002 |

OTHER PUBLICATIONS

Office Action, dated Jun. 1, 2004, from the Japanese Patent Office for Patent Application No. 2002–164642.

* cited by examiner

*Primary Examiner*—Hoang V. Nguyen
(74) *Attorney, Agent, or Firm*—Pillsbury Winthrop LLP

(57) ABSTRACT

The radio card of the present invention is such that corresponding unit radio cards do not have their antennas matched in configuration position to each other even if these unit radio cards are placed one over the other by inverting one relative to the other in a right/left inversion relation and in a top/down inversion relation or turning one through an angle of 180° relative to the other.

10 Claims, 5 Drawing Sheets

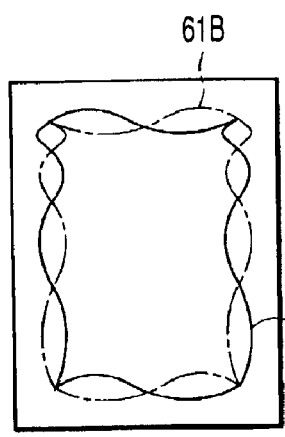
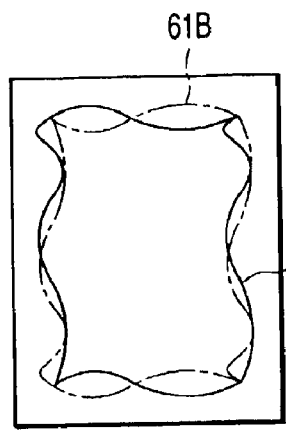
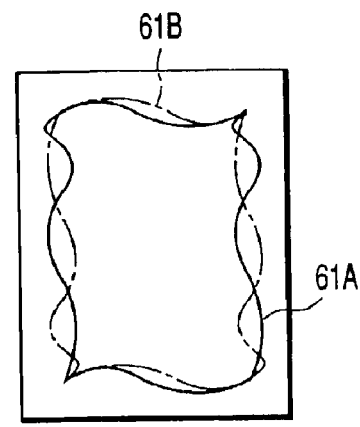
FIG. 8A    FIG. 8B    FIG. 8C
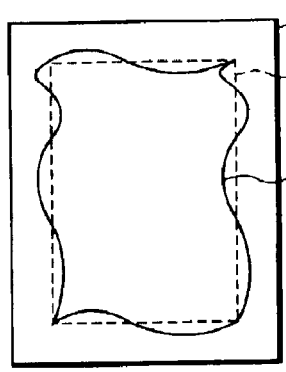
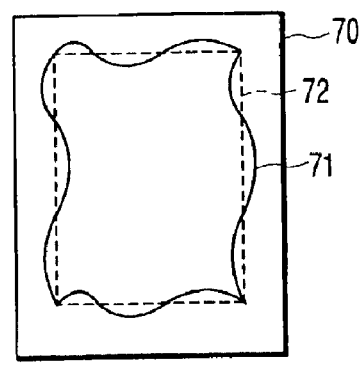
FIG. 7    FIG. 9
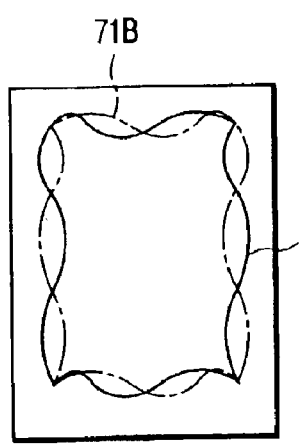
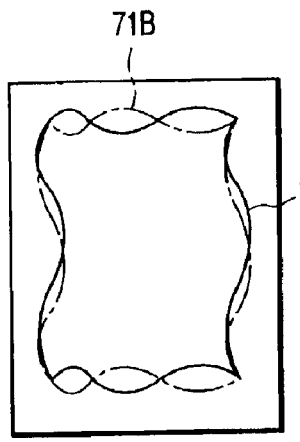
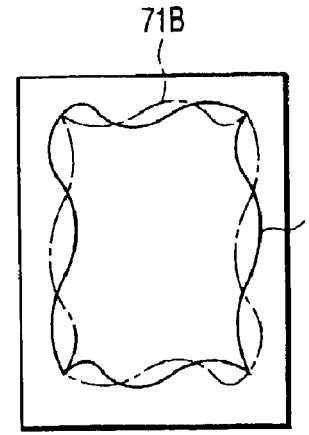
FIG. 10A    FIG. 10B    FIG. 10C

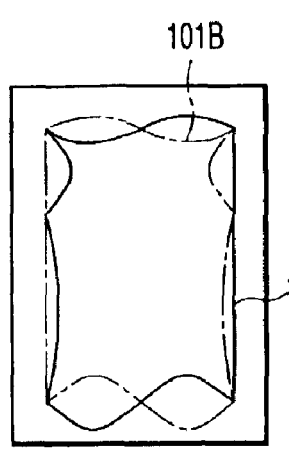 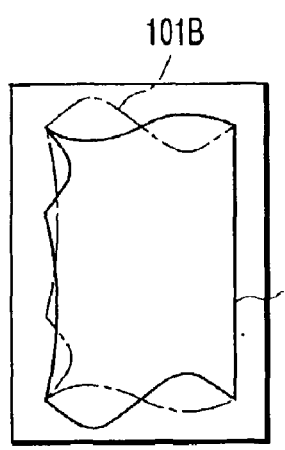 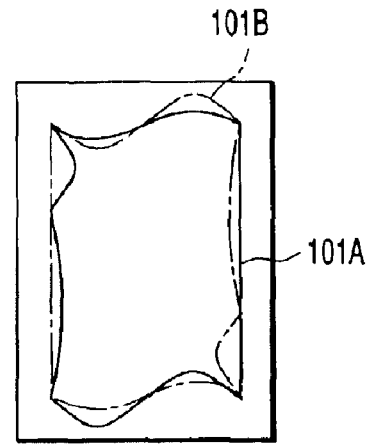
FIG. 16A     FIG. 16B     FIG. 16C
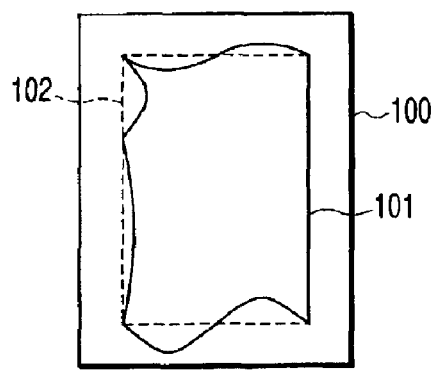 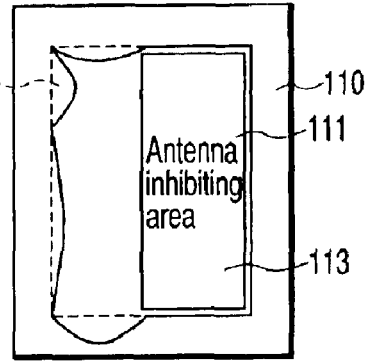
FIG. 15     FIG. 17
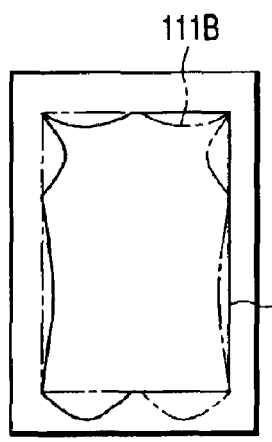 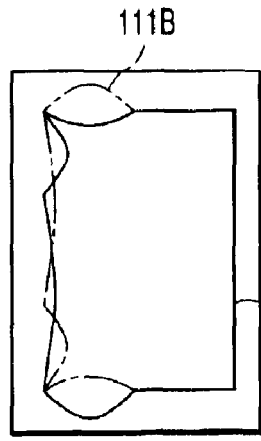 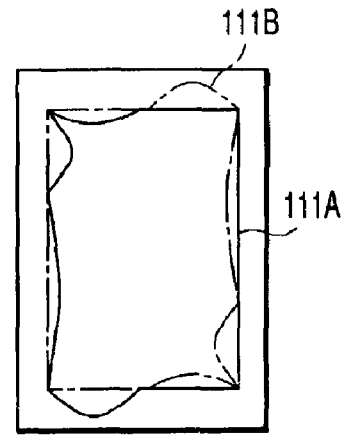
FIG. 18     FIG. 18B     FIG. 18C

RADIO CARD

CROSS-REFERENCE TO RELATED APPLICATIONS

This application is based upon and claims the benefit of priority from the prior Japanese Patent Application No. 2002-164642, filed Jun. 5, 2002, the entire contents of which are incorporated herein by reference.

BACKGROUND OF THE INVENTION

1. Field of the Invention

This invention relates to a radio card for allowing data transfer to be effected to and from a radio reader/writer in radio communication or allowing power reception from the radio reader/writer.

2. Description of the Related Art

In recent years, with the spread of radio cards, there has been a growing demand for a plurality of radio cards (hereinbelow referred to an unit radio cards) to be used in an overlapped state. When such unit radio cards are used in the overlapped state, there arises a problem such as a lowering in reception power resulting from antenna-to-antenna coupling in respective unit radio cards.

In a conventional radio card, however, the greater the aperture area of a coil (loop), the larger the reception power becomes. For this reason, use is often made of a loop antenna which can achieve the greatest aperture area in accordance with the outer configuration of the radio card. In a radio card of a rectangular configuration of a standard size, for example, use is often made of a loop antenna of a rectangular configuration corresponding to the outer configuration of the radio card so as to obtain the greatest loop.

In such a radio card, if a plurality of unit radio cards are placed one over the other, then the unit radio cards have their antennas substantially matched in configuration to each other. Therefore, their antenna-to-antenna coupling becomes stronger and there arises a lowering in reception power in the respective unit radio cards, thus exerting an adverse effect on the communication distance involved.

In order to solve such a problem, there is a conventional technique according to which, upon placing two unit radio cards one over the other in a face-to-face relation, their antennas are made not to be matched in configuration to each other. In this technique, it is assumed that an antenna is formed on the surface of the radio card and, based on this, the unit radio cards are made not to be matched in configuration to each other in a mutually opposite state.

Since, however, a normal radio card is often made of a thin card-like body, if the antennas of the unit radio cards are matched in configuration to each other even without the unit radio cards being set in a face-to-face relation, then the resonant frequency varies and there arise a lowering in reception voltage and a shortening in communication distance involved.

BRIEF SUMMARY OF THE INVENTION

The present invention is achieved with the above-mentioned problems in view and it is accordingly an object of the present invention to provide a radio card which, even if two unit radio cards are overlapped with respect to each other, can alleviate the lowering in reception power resulting from antenna-to-antenna coupling and secure a communication distance involved.

In one aspect of the present invention, there is provided a radio card for making radio communication comprises a card-like casing, an IC module provided in the casing, and an antenna electrically connected to the IC module and comprised of a coil of any given configuration, such antenna being not matched in configuration position to any other antenna even if such casings of two unit radio cards are superimposed in any direction except that these casings are matched to each other by orienting these two unit radio cards in a face/back matched relation and in a matched direction.

In another aspect of the present invention there is provided a radio card for making radio communication comprises, a card-like casing; an IC module provided in the casing, and an antenna electrically connected to the IC module and comprised of a coil configured to have a plurality of crosspoints relative to at least one of four straight lines defining a rectangle in the casing, the intervals of these crosspoints differing.

In another aspect of the present invention there is provided a radio card for making radio communication comprises a card-like casing, an IC module provided in the casing, and an antenna electrically connected to the IC module and comprised of a coil configured to have a plurality of crosspoints relative to at least one of four straight lines defining a rectangle in the casing, the portion between the crosspoints differing.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 7 is a view showing a practical form of antenna of a radio card according to a third embodiment of the present invention;

FIG. 8A is a view showing the state of antennas when corresponding unit radio cards are placed one over the other by inverting one relative to the other in a right/left inversion relation;

FIG. 8B is a view showing the state of antennas when corresponding unit radio cards are placed one over the other by inverting one relative to the other in a top/down inversion relation;

FIG. 8C is a view showing the state of antennas when corresponding unit radio cards are placed one over the other by turning one through an angle of 180° relative to the other;

FIG. 9 is a view showing a practical form of an antenna of a radio card according to a fourth embodiment of the present invention;

FIG. 10A is a view showing the state of antennas when corresponding unit radio cards of FIG. 9 are placed one over the other by inverting one relative to the other in a right/left inversion relation;

FIG. 10B is a view showing the state of antennas when corresponding unit radio cards are placed one over the other by inverting one relative to the other in a top/down inversion relation;

FIG. 10C is a view showing the state of antennas when corresponding unit radio cards of FIG. 9 are placed one over the other by turning one through an angle of 180° relative to the other;

FIG. 15 is a view showing a practical form of an antenna of a radio card according to a seventh embodiment of the present invention;

FIG. 16A is a view showing the state of antennas when corresponding unit radio cards of FIG. 15 are placed one over the other by inverting one relative to the other in a right/left inversion relation;

FIG. 16B is a view showing the state of antennas when corresponding unit radio cards of FIG. 15 are placed one over the other by inverting one relative to the other in a top/down inversion relation;

FIG. 16C is a view showing the state of antennas when corresponding unit radio cards of FIG. 15 are placed one over the other by turning one through an angle of 180° relative to the other;

FIG. 17 is a view showing a practical form of an antenna of a radio card according to an eighth embodiment of the present invention;

FIG. 18A is a view showing the state of antennas when corresponding unit radio cards of FIG. 17 are placed one over the other by inverting one relative to the other in a right/left relation;

FIG. 18B is a view showing the state of antennas when corresponding radio cards of FIG. 17 are placed one over the other by inverting one relative to the other in a top/down inversion relation; and FIG. 18C is a view showing the state of antennas when corresponding unit radio cards of FIG. 17 are placed one over the other by turning one through an angle of 180° relative to the other.

DETAILED DESCRIPTION OF THE INVENTION

The first to eighth embodiments of the present invention will be described below with reference to the accompanying drawing.

Figure 1:
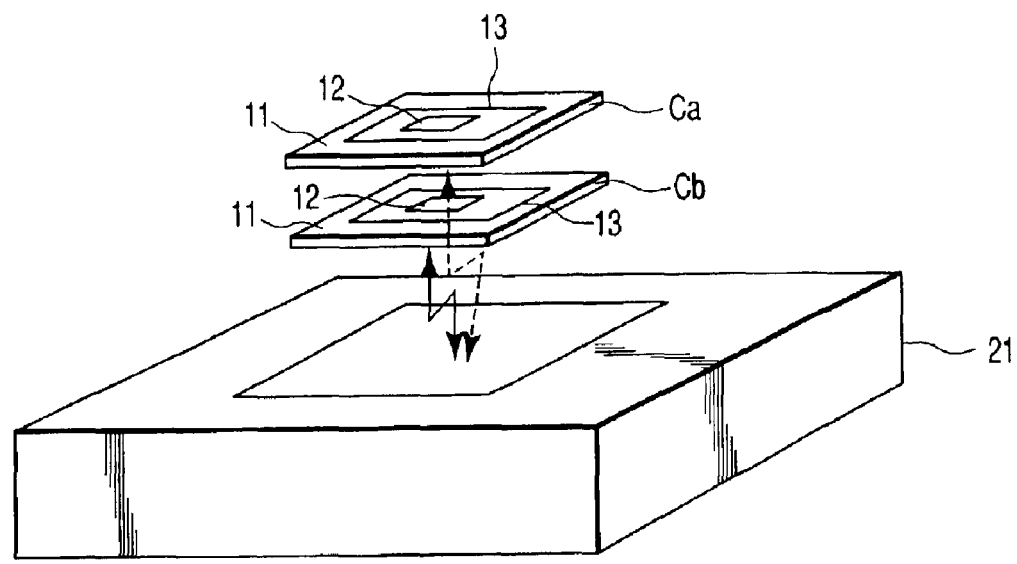
FIG. 1 is a view for explaining an example of use of a radio card according to each embodiment of the present invention.

FIG. 1 is a view showing a practical form of a radio card C (Ca, Cb) relating to a portable radio unit of the present invention. The radio card C is used to make radio communication with a reader/writer 21. The radio card C (Ca, Cb) is of such a type that respective unit cards Ca and Cb each have an IC module 12, an antenna 13, etc., in its card-like casing 11.

The casing 11 is comprised of a thin card of, for example, a rectangular configuration. The casing will be explained below as having a rectangular configuration specified under the standard. The casing 11 is not restricted to the rectangular configuration and may have a square, circular, or any given configuration. The antenna 13 is comprised of a loop antenna having a coil set in the casing 11. It is to be noted that the turns of the coil of the loop antenna can be properly set.

The IC module 12 comprises a CPU, a memory, a transmitting/receiving circuit, a power supply circuit, etc. The CPU generally controls the operation of the radio card C, such as radio communication with the reader/writer 21. The memory is used to store a control program and various kinds of data. The transmitting/receiving circuit is comprised of a control circuit for performing a transmit/receive operation (radio communication) to and from an external device by an electromagnetic wave transmitted and received through the antenna.

The reader/writer 21 is comprised of a device for making radio communication with the radio card C. The reader/writer 21 may be of such a type as to make radio communication with the radio card C singly or be connected to a higher-order device, such as a personal computer (PC), to make radio communication with the radio card C based on control instructions from the higher-order device.

As the radio card C, use is sometimes made of a plurality of unit radio cards. As shown in FIG. 1, for example, if two unit radio cards Ca, Cb are used together, their positional relation is arbitrary. In the case where these two unit radio cards Ca, Cb are used as having their antennas less overlapped with respect to each other, the antenna-to-antenna coupling of the unit radio cards is not so strong, with the result that the communication distance is not extremely shortened. In the case where the outlines of the casings of these unit radio cards Ca, Cb are closely contacted with each other in a more overlapped state, the antenna-to-antenna coupling is made stronger with the result that there is a lowering in reception power of the radio card and a shortening in the communication distance involved.

Now, an explanation will be made below about the antenna-to-antenna coupling between a plurality of unit radio cards.

Figure 2:
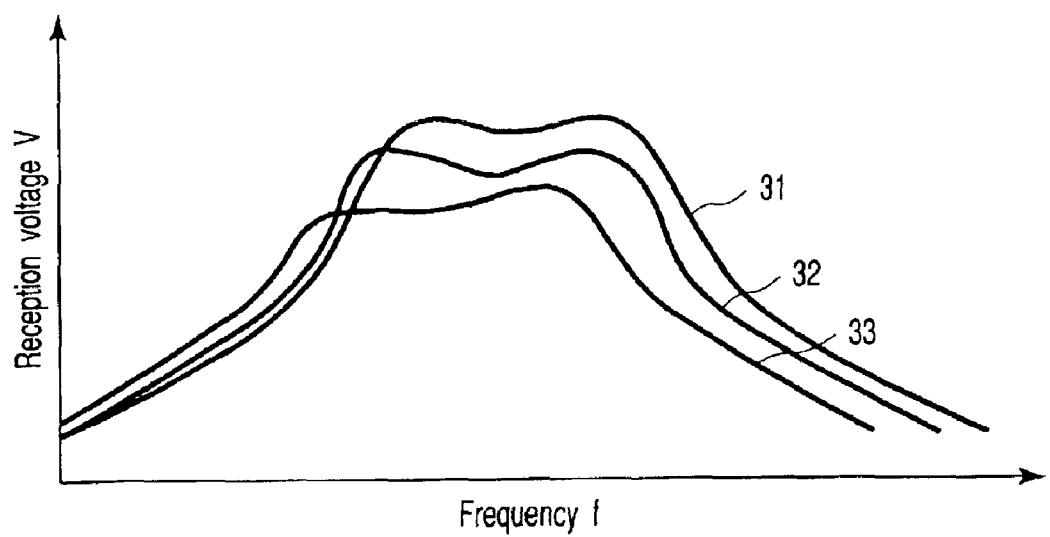
FIG. 2 is view for explaining antenna-to-antenna coupling of two unit radio cards.

FIG. 2 shows an example of the characteristic curves of reception voltage versus frequency of the radio card among a single radio card, a two-unit radio card type with less antenna-to-antenna coupling and a two-unit radio card type with a stronger antenna-to-antenna coupling.

In FIG. 2, characteristic curve 31 shows an example of reception voltage versus frequency for the single radio card; characteristic curve 32, an example for the two-unit radio card type with less antenna-to-antenna coupling; and characteristic curve 33, as example for the two-unit radio card type with a stronger antenna to antenna coupling.

That is, characteristic curve 31 for the single radio card reveals the most preferable reception voltage versus frequency relation. In contrast, characteristic curves 32 and 33 have a tendency to be lower in the reception voltage and in resonant frequency than characteristic curve 31, as shown in FIG. 2. Further in comparing characteristic curve 32 with characteristic curve 33, characteristic curve 33 is lower than characteristic curve 32 in terms of the reception voltage and resonant frequency.

If, therefore, the two unit radio cards are used in an overlapped state for communication, it is advantageous to reduce the antenna-to-antenna coupling of the two unit radio cards to the lowest possible extent.

Further, the configuration of a radio card is usually a rectangular configuration under the standard. For the loop antenna, in general, it is preferable that, in order to extend the communication distance, the aperture area of the loop of a coil be made as large as possible.

In the case where, therefore, the configuration of the radio card is rectangular, then a loop antenna set in the radio card can obtain a greater aperture area if it is made to nearly correspond to a rectangle following the rectangular configuration of the radio card. Thus it is preferable that, if a plurality of radio cards are used as unit radio cards, the antennas of the unit radio cards have the greatest possible aperture area and have configurations less overlapped with respect to each other.

In the first to eighth embodiments below, an explanation will be made about examples of these antennas applied to unit radio cards, that is, antennas less overlapped with respect to each other while having a greater aperture area, by referring to FIGS. 3 to 18.

In connection with the first to eighth embodiments, an explanation will be made below about the case where two unit radio cards are overlapped with each other. In the explanation below, the unit radio cards are rectangular in configuration and "inversion" means that one unit radio card is tuned upside down. In the following explanation, "right/left inversion" means that one of the two unit radio cards is inverted relative to the other with their longer sides as a reference to set these two unit radio cards in a face-to-face or back-to-back relation. Further, "up/down inversion" means that one of the two unit radio cards is inverted relative to the other with their short sides as a reference to set these two unit radio cards in a face-to-face or back-to-back relation. Further, "180° relation" means that, with the back and face of the two unit radio units and their directions matched, one of the two unit radio units is turned through an angle of 180° relative to the other, that is, the face of one unit radio card and back of the other unit radio card are overlapped in a face/back relation with their directions opposite to each other.

First, an explanation will be made below about the first embodiment.

Figure 3:
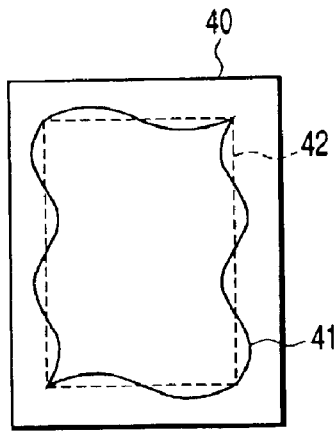
FIG. 3 shows a practical form of an antenna of a radio card according to a first embodiment of the present invention.

FIG. 3 shows a practical form of an antenna 41 of a radio card 40 of the first embodiment. The practical form of the antenna 41 shown in FIG. 3 has its respective opposite sides indicated as wavy sides relative to a rectangle indicated by a dotted line and corresponding to the configuration of the casing of the radio card 40.

That is, the antenna 41 shown in FIG. 3 has its respective sides indicated by the wavy lines relative to the rectangle 42 indicated by the dotted line in FIG. 3. In the practical form of the antenna shown in FIG. 3, an odd number of crosspoints are provided between the wavy lines and the respective opposite sides of the rectangle indicated by dotted lines and the intervals of the waves of each wavy line are equidistant to provide an antenna 41.

It is to be noted that the rectangle 42 indicated by the dotted line in FIG. 3 has a configuration following the rectangle as the outline of the casing of the radio card 40. For example, the rectangle 42 has such a preferable configuration as to obtain a greater aperture area at the loop of the antenna of the radio card 40.

Figure 4A:
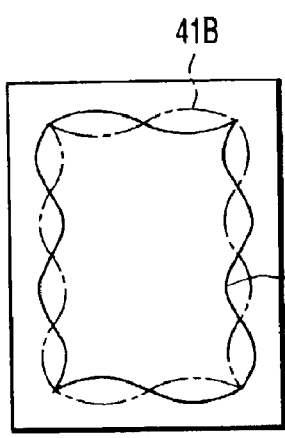
FIG. 4A is a view showing the state of antennas when corresponding unit radio cards of FIG. 3 are placed one over the other by inverting one relative to the other in a right-left inversion relation.
Figure 4B:
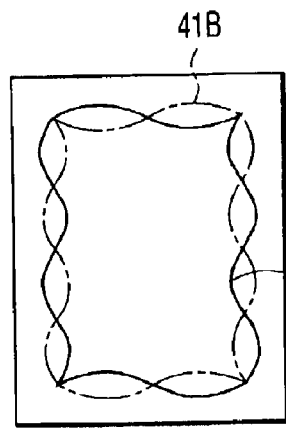
FIG. 4B is a view showing the state of antennas when corresponding unit radio cards of FIG. 3 are placed one over the other by inverting one relative to the other by a top/down inversion relation.
Figure 4C:
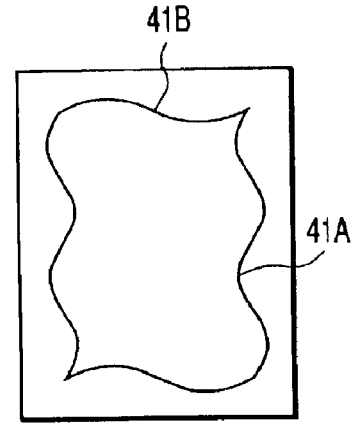
FIG. 4C is a view showing the state of antennas when corresponding unit radio cards of FIG. 3 are placed one over the other by turning one through an angle of 180° relative to the other.

FIGS. 4A, 4B and 4C show views of two overlapped unit radio cards 40 having the antenna 41 shown in FIG. 3.

FIG. 4A shows the state of the antennas when two unit radio cards 40 having antennas 41 are mutually overlapped by right/left inversion.

FIG. 4B shows the state of the antennas when two unit radio cards 40 having antennas 41 are mutually overlapped by up/down inversion.

FIG. 4C shows the state of the antennas when two unit radio cards 40 having antennas 41 are mutually overlapped by turning one of the cards through 180° relative to the other.

As shown in FIGS. 4A and 4B, when the two unit radio cards 40 are mutually overlapped by inverting one relative to the other in a right/left or top/down relation, their antennas 41 are not matched to each other. If, therefore, the unit radio cards 40 are so overlapped by inverting one relative to the other in the right/left or top/down relation, the antennas 41 of the two unit radio cards 40 are not matched in an overlapped state and it is possible to weaken their antenna-to-antenna coupling.

As shown in FIG. 4C, when the unit radio cards 40 are mutually overlapped by turning one through an angle of 180° relative to the other, then their antennas 41 are superimposed in a matched state and, therefore, the antenna-to-antenna coupling is stronger.

Further, the antenna 41 shown in FIG. 3 may be so configured that the amplitude, etc., of the wave of each wavy line may be changed. In this case, even if one unit radio card is turned through an angle of 180° relative to the other unit radio card, their antennas 41 are less overlapped, and it is possible to weaken the antenna-to-antenna coupling.

Further, even in the case of the right/left inversion or top/down inversion, the antennas 41 of the two unit radio cards 40 are less overlapped in their loop areas than in the case shown in FIG. 4C. For this reason, the coupling between the antennas 61 can be made weaker than in the case of FIG. 4C.

In the first embodiment, the configuration of the antenna may be formed with the use of a combination pattern of a straight line, a curve, etc. Even in this case, it is possible to obtain the same effect as the antenna 41 whose configuration is as shown in FIG. 3.

An explanation will now be made below about a second embodiment.

Figure 5:
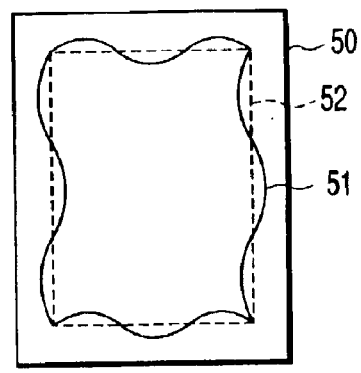
FIG. 5 is a view showing a practical form of an antenna of radio card according to a second embodiment of the present invention.

FIG. 5 shows a practical form of an antenna 51 in the radio card 50 according to the second embodiment of the present invention. The antenna 51 shown in FIG. 5 has wavy sides relative to a rectangle 52 indicated by the dotted lines and corresponding to the configuration of the casing of the radio card 50.

That is, the antenna 51 shown in FIG. 5 is formed as wavy lines relative to the sides of a rectangle 52 indicated by the dotted lines in FIG. 5. The configuration of the antenna 51 shown in FIG. 5 is such that the intervals of waves of respective wavy lines are equidistant as in the configuration of the antenna 41 shown in FIG. 3. In the configuration of the antenna 51 shown in FIG. 5, an even number of crosspoints are provided between the respective wavy lines and the respective sides of the rectangle 52 indicated by the dotted lines, an aspect which is different from the configuration of the antenna shown in FIG. 3.

The rectangle 52 indicated by the dotted lines in FIG. 5 has a configuration following the outline of the rectangle of the casing of the radio card 50. For example, the rectangle 52 has such a desirable configuration as to obtain a greater aperture area at the loop of the antenna of the radio card 50.

Figure 6A:
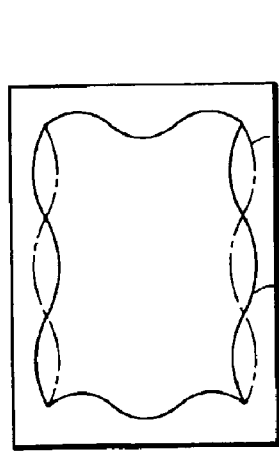
FIG. 6A is a view showing the state of antennas when corresponding unit radio cards of FIG. 5 are placed one over the other by inverting one relative to the other in a right/left inversion relation.
Figure 6B:
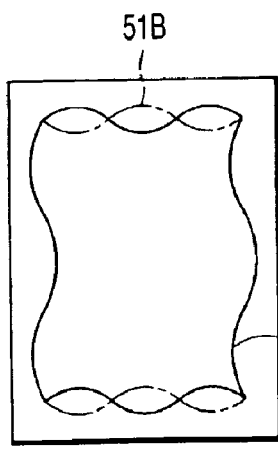
FIG. 6B is a view showing the state of antennas when corresponding unit radio cards are placed one over the other by inverting one relative to the other in a top/down inversion relation.
Figure 6C:
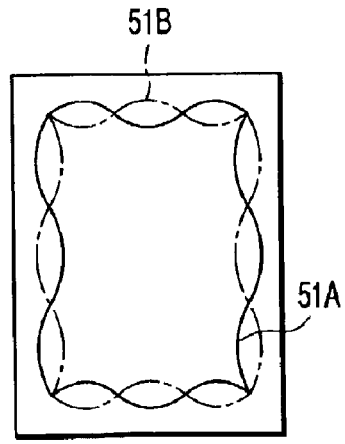
FIG. 6C is a view showing the state of antennas when corresponding unit radio cards are placed one over the other by turning one through an angle of 180° relative to the other.

FIGS. 6A, 6B and 6C are examples of superimposing two unit radio cards 50 each having the antenna of the configuration shown in FIG. 5.

FIG. 6A shows the state of the antennas 51 when these two unit radio cards have their antennas overlapped with respect to each other by inverting one relative to the other in the right/left inversion relation.

FIG. 6B shows the state of the antennas 51 when these two unit radio cards 50 have their antennas overlapped with respect to each other by inverting one relative to the other in the top/down inversion relation.

FIG. 6C shows the state of the antennas when these two unit radio cards 50 have their antennas overlapped with respect to each other by turning one through an angle of 180° relative to the other.

Although the two unit radio cards are so superimposed by the right/left inversion or top/down inversion, the configurations of these antennas are not completely superimposed but, of their four wavy lines corresponding to the four sides of the rectangle 52, their opposite two wavy lines are matched to each other as shown in FIGS. 6A and 6B.

In the case of the right/left inversion shown in FIG. 6A, for example, the two wavy lines corresponding to the opposite two short sides of the rectangle 52 are matched to each other, while, in the case of the top/down inversion shown in FIG. 6B, the opposite two wavy lines corresponding to the long sides of the rectangle 52 are matched to each other.

That is, in the case where two unit radio cards 50 are superimposed one on the other by right/left inversion or top/down inversion, as shown in FIG. 6A or 6B, the antennas 51 of the two unit radio cards 50 are partly matched, the other portions not being matched to each other. For this reason, the antenna-to-antenna coupling of the two unit radio cards 50 is weaker than in the case where the two antennas have their configurations completely matched to each other.

In the case of superimposing the two unit radio cards by turning one of them through 180° relative to the other as shown in FIG. 6C, their antennas are not matched in their configuration to each other and, therefore, the antenna-to-antenna coupling is weaker.

In the second embodiment, the configuration of the antenna 51 as shown in FIG. 5 may be changed by varying the amplitude, etc., of the waves of each wavy line.

That is, when the amplitude, etc., of the waves of each wavy line of the antenna 51 shown in FIG. 5 is changed, if right/left inversion or top/down inversion is effected, the configurations of the antennas are less matched to each other than in the case of the antenna 51 shown in FIG. 5 and it is, therefore, possible to further weaken their antenna-to-antenna coupling. Where the amplitude, etc., of the waves of each wavy line of the antenna 51 is changed, if a 180° rotation is effected, then the overlapped loop area of the antennas of the two unit radio cards is smaller than in the case of FIG. 6C and it is, therefore, possible to weaken the antenna-to-antenna coupling compared with the case of FIG. 6C.

In the second embodiment, the configuration of the antenna may be formed by a combination pattern of a straight line, curve, etc. Even in this case, it is possible to obtain the same advantage as that for the antenna 51 of the configuration shown in FIG. 5.

An explanation will now be made about the third embodiment of the present invention.

FIG. 7 shows a practical form of an antenna 61 of a radio card 60 according to the third embodiment. In the practical form of the antenna 61 shown in FIG. 7, relative to a rectangle 62 indicated by the dotted line, the antenna 61 has a wavy configuration at each side corresponding to the configuration of the casing of a radio card 60.

That is, the antenna 61 shown in FIG. 7 has those wavy lines corresponding in configuration to opposite sides of the rectangle 62 indicated by the dotted line in FIG. 7. The configuration of the antenna 61 shown in FIG. 7 is such that an odd number of crosspoints are provided between each side of the rectangle 62 indicated by the dotted line and each corresponding wavy line with different wave intervals.

It is to be noted that the rectangle 62 indicated by the dotted line in FIG. 7 has a configuration following the outline of the casing of the radio card 60. For example, the rectangle 62 has such a desirable configuration as to obtain a greater aperture area at the loop of the antenna of the radio card 60.

FIGS. 8A, 8B and 8C are examples in which two unit radio cards 60 having the antenna 61 of the configuration shown in FIG. 7 are superimposed one over the other.

FIG. 8A shows the state of the antennas when two unit radio cards 60 having these antennas 61 are superimposed one over the other by right/left inversion.

FIG. 8B shows the state of the antennas when two unit radio cards 60 having these antennas 61 are superimposed one over the other by top/down inversion.

FIG. 8C shows the state of these antennas when two unit radio cards 60 having the antenna 61 are superimposed by turning one through 180° relative to the other.

As indicated in FIGS. 8A, 8B and 8C, when the two unit radio cards 60 are superimposed by right/left inversion, top/down inversion and 180° rotation, the configurations of these two antennas 61 are not matched to each other and hence the antenna-to-antenna coupling is made weaker.

In the third embodiment, the configuration of the antenna 61 as shown in FIG. 7 may be changed by varying the amplitude, etc., of the waves of each wavy line.

In this case, the loop areas of the respective antennas of the two unit radio cards are less overlapped than those in FIGS. 8A, 8B and 8C and, therefore, the antenna-to-antenna coupling can be made weaker than that in the case of FIGS. 8A, 8B and 8C.

In the third embodiment, the configurations of the antennas may be so defined as to include a combination pattern of a line, a curve, etc. Even in this case, the same advantage as that of the antenna shown in FIG. 7 can be obtained.

An explanation will now be made below about the fourth embodiment.

FIG. 9 shows a practical form of an antenna 71 of a radio card 70 of the fourth embodiment. In the practical form of the antenna 71 shown in FIG. 9, relative to a rectangle 72 indicated by the dotted line and corresponding in configuration to the casing of the radio card 70, the antenna has a wavy configuration at each side.

That is, the antenna 71 shown in FIG. 9 has a wavy line corresponding in configuration to each side of the rectangle 72. The configuration of the antenna 71 shown in FIG. 9 is so defined as to include an even number of crosspoints between the respective side 72 of the rectangle 72 indicated by the dotted line and the corresponding wavy line, noting that the wave intervals in the respective wavy line differ.

It is supposed that the rectangle 72 indicated by the dotted line in FIG. 9 is so configured as to follow the rectangular outline of the casing of the radio card 70. For example, the rectangle 72 has such a desirable configuration as to obtain a greater aperture area at the loop of the antenna of the radio card 70.

FIGS. 10A, 10B and 10C each show two overlapped unit radio cards 70 having antennas 71 of the configuration shown in FIG. 9.

FIG. 10A shows the state of the antennas when two unit radio cards 70 have their antennas 71 mutually overlapped by inverting one relative to the other in the right/left inversion relation.

FIG. 10B shows the state of the antennas when two unit radio cards 70 have their antennas 71 mutually overlapped by inverting one relative to the other in the top/down inversion relation.

FIG. 10C shows the state of the antennas when two unit radio cards 70 are mutually overlapped by turning one through 180° relative to the other.

In the case where the two radio cards 70 are mutually overlapped by right/left inversion, top/down inversion and 180° rotation as shown in FIGS. 10A, 10B and 10C, these antennas 71 are not matched in configuration to each other and, therefore, the antenna-to-antenna coupling is made weaker.

In the fourth embodiment, the configuration of the antenna as shown in FIG. 9 may be changed by varying the configuration of each wavy line such as the amplitude, etc., of its wave. In this case, two unit radio cards 70 are less overlapped in their antenna loop areas than in the cases of FIGS. 10A, 10B and 10C and, therefore, the antenna-to-antenna coupling can be made weaker than in the case of FIGS. 10A, 10B and 10C.

In the fourth embodiment, the configuration of the antenna may be changed by the use of a combination pattern, such as a line, a curve, etc. Even in this case, it is possible to obtain the same advantage as in the antenna of the configuration shown in FIG. 9.

An explanation will be made below about the fifth embodiment.

Figure 11:
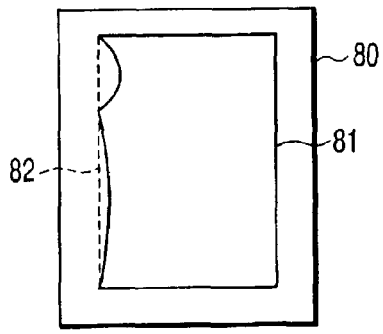
FIG. 11 is a view showing a practical form of an antenna of a radio card according to a fifth embodiment.

FIG. 11 shows a practical form of an antenna 81 of a radio card 80 according to the fifth embodiment. The antenna 81 shown in FIG. 11 is so configured that, of the four sides of a rectangle 82 indicated by the solid and dotted lines, three sides are straight lines and the remaining one side is a curvy line having waves of different amplitudes and intervals.

It is to be noted that the rectangle 82 indicated by the dotted line in FIG. 11 is so configured as to follow the outer configuration of the casing of the radio card 80. For example, the rectangle 82 has such a desirable configuration as to obtain a greater aperture area at the loop of the antenna of the radio card 80.

Figure 12A:
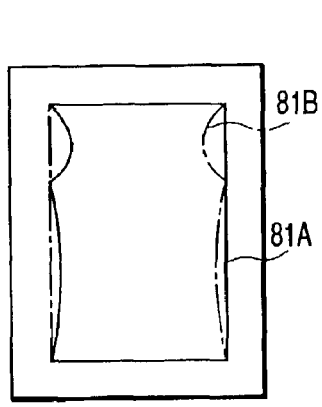
FIG. 12A is a view showing the state of antennas when corresponding unit radio cards of FIG. 11 are placed one over the other by inverting one relative to the other in a right/left inversion relation.
Figure 12B:
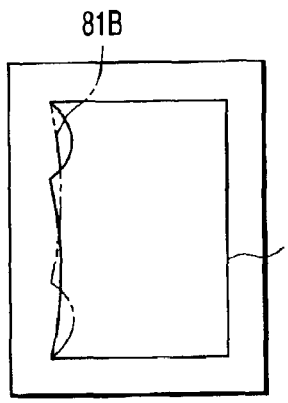
FIG. 12B is a view showing the state of antennas when corresponding unit radio cards of FIG. 11 are placed one over the other by inverting one relative to the other in a top/down inversion relation.
Figure 12C:
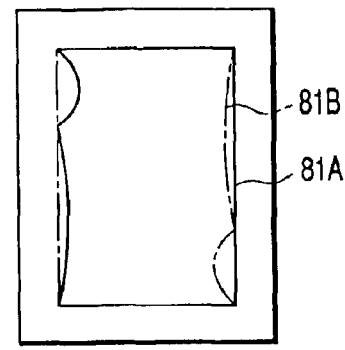
FIG. 12C is a view showing the state of antennas when corresponding unit radio cards of FIG. 11 are placed one over the other by turning one through an angle of 180° relative to the other.

FIGS. 12A, 12B and 12C are examples in which two unit radio cards 80 each having an antenna 81 of the configuration shown in FIG. 11 are overlapped with respect to each other.

FIG. 12A shows the state of the antennas when two unit radio cards 80 each having the antenna 81 are mutually overlapped by inverting one relative to the other in a right/left inversion relation.

FIG. 12B shows the state of the antennas when two unit radio cards 80 each having the antenna 81 are mutually overlapped by inverting one relative to the other in a top/down inversion relation.

FIG. 12C shows the state of the antennas when two unit radio cards 80 each having the antenna 81 are mutually overlapped by turning one through 180° relative to the other.

In the case where the two unit radio cards are overlapped by right/left inversion, top/down inversion and 180° rotation as shown in FIGS. 12A, 12B and 12C, respectively, these antennas 81 are not matched in configuration to each other and, therefore, their antenna-to-antenna coupling is made weaker.

In the fifth embodiment, the configuration of the antenna 81 is of such a type as to include an inwardly curved line having a plurality of concave sections relative to the rectangle 82. The configuration of the antenna in the fifth embodiment may be so defined as to include an outwardly convex line relative to the rectangle 82, if such a configuration permits, relative to the casing of the radio card.

Further, in the fifth embodiment, the curved section of the antenna as shown in FIG. 11 may be formed to include a straight line, curve, etc., in any proper combination, so that such two antennas are not matched in configuration to each other when they are mutually overlapped by top/down inversion.

Even in these cases, it is possible to obtain the same advantage as that of the antenna of the configuration shown in FIG. 11.

An explanation will now be made below about the sixth embodiment.

Figure 13:
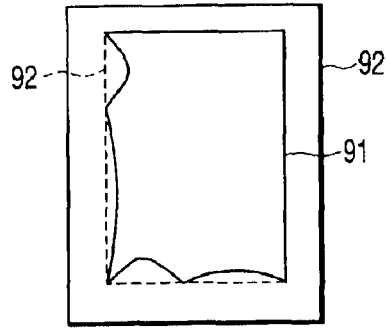
FIG. 13 is a view showing the state of an antenna of a radio card according to a sixth embodiment of the present embodiment.

FIG. 13 is a practical form of the antenna 91 of a radio card 90 according to the sixth embodiment. The configuration of the antenna 91 shown in FIG. 13 is so defined as to include two straight lines relative to two sides of a rectangle 92 indicated by the dotted and straight lines and a plurality of curves having waves of different amplitudes and intervals relative to the remaining two sides of the rectangle 92.

It is to be noted that the rectangle 92 indicated by the dotted lines in FIG. 13 is so defined as to follow the rectangular outline of the casing of the radio card 90. For example, the rectangle 92 has such a desirable configuration as to provide a greater aperture area at the loop of the antenna of the radio card 90.

Figure 14A:
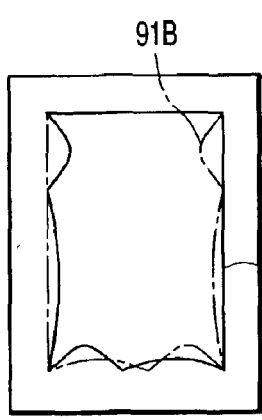
FIG. 14A is a view showing the state of antennas when corresponding unit radio cards of FIG. 13 are placed one over the other by inverting one relative to the other in a right/left inversion relation.
Figure 14B:
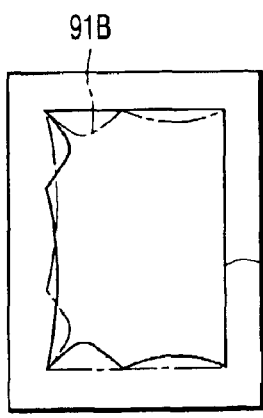
FIG. 14B is a view showing the state of antennas when corresponding unit radio cards of FIG. 13 are placed one over the other by inverting one relative to the other in a top/down inversion relation.
Figure 14C:
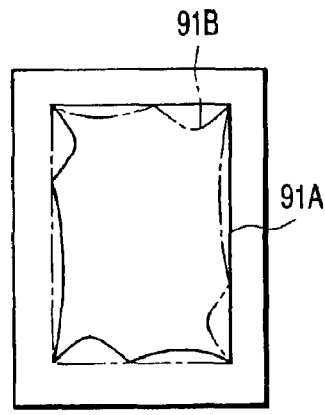
FIG. 14C is a view showing the state of antennas when corresponding unit radio cards of FIG. 13 are placed one over the other by turning one through an angle of 180° relative to the other.

FIGS. 14A, 14B and 14C each show an example in which two unit radio cards 90 having the antennas 91 shown in FIG. 13 are overlapped with respect to each other.

FIG. 14A shows the state of the antennas when two unit radio cards 90 have their antennas 91 mutually overlapped by inverting one relative to the other in a right/left inversion relation.

FIG. 14B shows the state of the antennas when two unit radio cards 90 have their antennas 91 mutually overlapped by inverting one relative to the other in a top/down inversion relation.

FIG. 14C shows the state of the antennas when two unit radio cards 90 have their antennas mutually overlapped by turning one through 180° relative to the other.

As shown in FIGS. 14A, 14B and 14C, when the two unit radio card 90 are overlapped by right/left inversion, top/down inversion or 180° rotation, these antennas 91 are not matched in configuration to each other, so that the antenna-to-antenna coupling is made weaker.

In the sixth embodiment, the practical form of the antenna 91 shown in FIG. 13 has its curved lines formed to include inwardly concave waves relative to the rectangle 92. The configuration of the antenna in the sixth embodiment may have outwardly convex waves relative to the rectangle 92, if these permit, relative to the casing of the radio card 90.

In the sixth embodiment, the curved sections of the example shown in FIG. 13 may be formed to include a straight line, a curve, etc., in any proper combination so as to prevent these from being matched in configuration to each other by the right/left inversion and top/down inversion.

Even in these cases, it is possible to obtain the same advantage as that of the antenna shown in FIG. 13.

An explanation will now be made below about the seventh embodiment.

FIG. 15 is a view showing a practical form of an antenna 101 of a radio card 100 according to the seventh embodiment. The configuration of the antenna 101 shown in FIG. 15 is so formed as to include a straight line relative to one of the four sides of the rectangle 102 indicated by the dotted and solid lines and a plurality of waves having a different amplitude and interval relative to the remaining three sides of the rectangle 102.

It is to be noted that the rectangle 102 shown by the dotted line in FIG. 15 has such a configuration as to follow the rectangular outline of the casing of the radio card 100. For example, the rectangle 102 has such a desirable configuration as to obtain a greater aperture area at the loop of the antenna of the radio card 100.

FIGS. 16A, 16B and 16C show examples in which two unit radio cards 100 have their antennas 101 (antennas having the configuration shown in FIG. 15) overlapped with respect to each other.

FIG. 16A shows the state of the antennas when two unit radio cards 100 have their antennas overlapped with respect to each other by inverting one relative to the other in a right/left inversion relation.

FIG. 16B shows the state of the antennas when two unit radio cards 100 have their antennas 101 overlapped with respect to each other by inverting one relative to the other in an top/down inversion relation.

FIG. 16C shows the state of the antennas when two unit radio cards 100 have their antennas overlapped with respect to each other by turning one through 180° relative to the other.

As shown in FIGS. 16A, 16B and 16C, when the two unit radio cards 100 are placed one over the other by right/left inversion, top/down inversion or 180° rotation, these antennas 101 are not matched in configuration to each other. Therefore, it is possible to weaken the antenna-to-antenna coupling.

In the seventh embodiment, the antennas 101 is so configured as to include inwardly concave waves relative to the rectangle 102 as shown in a practical form in FIG. 15. The configuration of the antenna in the seventh embodiment may be so defined as to include outwardly convex waves relative to the rectangle 102, if such configuration permits, relative to the casing of the radio used.

In the seventh embodiment, the practical form of the antenna as shown in FIG. 15 may be so configured as to include a straight line, a curve, etc., in any given combination pattern in a manner not to have one antenna matched in configuration position to the other antenna by the right/left inversion and top/bottom inversion.

Even in these cases, it is possible to obtain the same advantage to that of the antenna shown in FIG. 15.

An explanation will be made below about the eight embodiment of the present invention.

FIG. 17 shows a practical form of an antenna 111 of a radio card according to the eighth embodiment. The antenna 111 shown in FIG. 17 is so configured as to include a straight line relative to a portion of a rectangle 112 indicated by the dotted line and a curve relative to the other portion of the rectangle. The curved portion of the antenna shown in FIG. 17 is so configured as to include a plurality of curves, etc., having waves of different amplitudes and intervals.

Further, the straight portion shown in FIG. 17 corresponds to an area 113 around which the setting of an antenna is inhibited. The antenna inhibiting area 113 is secured to provide an embossed area for braille, etc., on the radio card.

It is to be noted that the rectangle 112 indicated by the dotted line in FIG. 17 has such a configuration as to follow the rectangular outline of the casing of the radio card. For example, the rectangle 112 has such a desirable configuration as to provide a larger aperture area at the loop of the antenna of the radio card 110.

FIGS. 18A, 18B and 18C are each a view showing the state of the antennas when two unit radio cards 110 have their antennas 111 (antennas having the configuration shown in FIG. 17) overlapped with respect to each other.

FIG. 18A shows the state of the antennas 110 when the two unit radio cards 110 have their antennas 111 overlapped with respect to each other by inverting one relative to the other in a right/left inversion relation.

FIG. 18B shows the state of antennas 111 when the two unit radio cards 110 have their antennas 111 overlapped with respect to each other by inverting one relative to the other in a top/down inversion relation.

FIG. 18C shows the state of the antennas 111 when the two unit radio cards have their antennas 111 overlapped with respect to each other by turning one through 180° relative to the other in a 180° rotation relation.

In the case where, as shown in FIGS. 18A, 18B and 18C, the two unit radio cards 110 have their antennas overlapped with respect to each other by right/left inversion, top/down inversion or 180° rotation, these two antennas 111 are not matched in configuration to each other and it is possible to weaken the antenna-to-antenna coupling.

In the eighth embodiment, the practical form of the antenna 111 is shown in FIG. 17 to have such a configuration as to include an inwardly concave curve relative to the rectangle 112. The configuration of the antenna of the eighth embodiment may be so defined as to include an outwardly convex curve relative to the rectangle 112, if no restriction is made thereby, relative to the casing of the radio card 110.

In the eighth embodiment, the curved portion of the antenna shown in FIG. 17 may include a straight line, a curve, etc., in any given combination pattern, so that such antennas are not matched in configuration to each other by the right/left inversion and top/down inversion.

Even in these cases, it is possible to obtain the same advantage as in the antenna of the form shown in FIG. 17.

In the radio card, normally, an antenna inhibiting area is often provided as shown in FIG. 17. The configuration of the antenna as set out in connection with the first to seventh embodiments as well as the eighth embodiment are realized within a range restricted by the above-mentioned antenna inhibiting area 113.

According to the first to eighth embodiments, as set out above, the configuration of the antenna is so defined as to have a curved portion or a given combination pattern of a curve and straight line. In this way, even if two radio cards are superimposed one over the other, it is possible to alleviate the lowering in reception power resulting from the antenna-to-antenna coupling and thus to secure a communication distance on the respective radio card.

Further, according to the first to eighth embodiments, it is possible to form various forms of antennas and hence to lower the antenna-to-antenna coupling between different kinds of unit radio cards.

In the first to eighth embodiments, even if, out of two unit radio cards having the same face and back configurations, one unit radio card is inverted relative to the other unit radio card to set them in a face-to-face or back-to-back relation and, in this state, these two unit radio cards are rotated in any given way, their antennas are not matched in configuration to each other. Further, even if these two radio cards are also rotated in any way in the same face and back states, the configurations of their antennas are not matched to each other except that these two unit radio cards are oriented in the same direction.

Even if, by doing so, two unit radio cards are used in an superimposed state, it is possible to provide a radio card which can alleviate the lowering in reception power resulting from the antenna-to-antenna coupling and secure a communication distance relative to the two unit radio cards.

Even if, in any states of the first to eighth embodiments, the two unit radio cards are placed one over the other in a manner to be slightly displaced away from each other, their antennas are not matched in configuration to each other. For this reason, a radio card can be provided which can alleviate the lowering in reception power resulting from the antenna-to-antenna coupling and secure a communication distance involved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio card capable of radio communications, comprising:

a casing having a shape of a card;

an IC module provided within the casing; and a loop antenna provided within the casing and electrically coupled to the IC module, wherein the loop antenna is configured with a shape that generally follows the periphery of the casing such that an aperture area of the loop antenna is maximized, and wherein the shape of the loop antenna includes at least one wave-like formation so that if two radio cards having identical loop antenna configurations are superimposed in any orientation other than having the tops of the radio cards aligned with the front side of one radio card facing the back side of the other radio card, the superimposition results in a mismatch of the respective loop antenna configurations.

2. The radio card of claim 1, wherein the casing includes an antenna inhibiting area such that the loop antenna is configured with a shape that avoids the antenna inhibiting area.

3. The radio card of claim 2, wherein the antenna inhibiting area is an area in which embossing is performed with respect to the casing.

4. The radio card of claim 1, wherein the casing has a substantially rectangular shape.

5. The radio card of claim 1, wherein the shape of the loop antenna is substantially a modified rectangular shape in which at least one of the sides includes the wave-like formation.

6. The radio card of claim 1, wherein the shape of the loop antenna is substantially a modified rectangular shape in which at least two of the sides includes the wave-like formation.

7. The radio card of claim 1, wherein the shape of the loop antenna is substantially a modified rectangular shape in which at least three of the sides includes the wave-like formation.

8. The radio card of claim 1, wherein the shape of the loop antenna is substantially a modified rectangular shape in which each of the four sides includes the wave-like formation.

9. The radio card of claim 8, wherein the wave-like formations of the four sides are asymmetrical relative to each other.

10. The radio card of claim 1, wherein the shape of the loop antenna is configured so that if two radio cards having identical loop antenna configurations are superimposed with the front side of one radio card facing the back side of the other radio card and one of the cards is rotated 180° relative to the other card, the superimposition results in a substantial mismatch of the respective loop antenna configurations.

* * * * *